US011169818B2

(12) United States Patent
Suryanarayana et al.

(10) Patent No.: US 11,169,818 B2
(45) Date of Patent: Nov. 9, 2021

(54) SYSTEMS AND METHODS FOR DYNAMICALLY LOCATING AND ACCESSING OPERATING SYSTEM (OS) FILE SYSTEM DATA FROM A PRE-BOOT ENVIRONMENT (71) Applicant: DELL PRODUCTS L.P., Round Rock, TX (US)

(72) Inventors: Shekar Babu Suryanarayana, Bangalore (IN); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 16/394,652

(22) Filed: Apr. 25, 2019

(65) Prior Publication Data
US 2020/0341774 A1 Oct. 29, 2020

(51) Int. Cl.
G06F 9/00 (2006.01)
G06F 15/177 (2006.01)
G06F 9/4401 (2018.01)
G06F 16/907 (2019.01)
G06F 11/14 (2006.01)
G06F 9/50 (2006.01)

(52) U.S. Cl.
CPC ............ G06F 9/441 (2013.01); G06F 9/5061 (2013.01); G06F 11/1435 (2013.01); G06F 16/907 (2019.01)

(58) Field of Classification Search
CPC .. G06F 11/1435; G06F 16/164; G06F 16/178; G06F 16/907; G06F 9/441; G06F 9/5061
See application file for complete search history.

(56) References Cited

U.S. PATENT DOCUMENTS

| 2006/0174055 A1* | 8/2006 | Flynn ..................... | G06F 9/4406 711/100 |
| 2014/0129819 A1* | 5/2014 | Huang .................. | G06F 9/4416 713/2 |
| 2015/0134945 A1* | 5/2015 | Takami ................. | G06F 9/4401 713/2 |
| 2015/0235029 A1* | 8/2015 | Morishige ............. | G06F 21/572 713/1 |

(Continued)

OTHER PUBLICATIONS

Dell Inc., "Dell SupportAssist OS Recovery" Rev A05 dated Feb. 2019, 24 pages.

(Continued)

Primary Examiner — Nitin C Patel
(74) Attorney, Agent, or Firm — Egan, Enders & Huston LLP.

(57) ABSTRACT

Systems and methods that may be implemented in a Unified Extensible Firmware Interface (UEFI) pre-boot environment time to dynamically locate and load bootable images stored in one or more operating system (OS) partitions on a system storage device/s (e.g., HDD, SSD) that is formatted with an advanced filesystem (e.g., such as NTFS, EXT3, etc.). An OS-based filesystem-independent method may be provided to access OS filesystem data during UEFI pre-boot time. Individual selected boot images stored across multiple OS filesystem partitions may be located and loaded to boot from UEFI pre-boot.

24 Claims, 6 Drawing Sheets (56) References Cited

U.S. PATENT DOCUMENTS

2016/0140038 A1\* 5/2016 Anbazhagan ....... G06F 11/1417
711/202
2020/0097274 A1\* 3/2020 Sarkar .................. G06F 9/4416

OTHER PUBLICATIONS

Wikipedia, "Boot Image" Printed from Internet Mar. 30, 2019, 3 pages.
Margaret Rouse, Microsoft Windows Recovery Environment (Windows RE), Printed from Internet Mar. 30, 2019, 4 pages.
Microsoft, "Hard drives and partitions" May 1, 2017, 6 pages.
Wikipedia, "EFI system partition" Printed from Internet Mar. 31, 2019, 4 pages.
Wikipedia, "GUID Partition Table" Printed from Internet Mar. 31, 2019, 16 pages.

\* cited by examiner

SYSTEMS AND METHODS FOR DYNAMICALLY LOCATING AND ACCESSING OPERATING SYSTEM (OS) FILE SYSTEM DATA FROM A PRE-BOOT ENVIRONMENT

FIELD

This invention relates generally to information handling systems, and more particularly, to operating system (OS) filesystem data for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Operating systems, such as Microsoft Windows, are typically implemented on an information handling system by bootable images and files stored in OS partitions on system permanent storage, such as system hard disk drive (HDD) or solid state drive (SSD). The OS partitions are typically formatted with advanced filesystems such as NTFS, EXT3, etc. A diagnostic or service OS (e.g., such as Windows RE) may also be stored in OS partitions. Bootable images stored in the OS partitions may include the diagnostic/service OS, utilities and troubleshooting and diagnostic tools, and also boot and data recovery information. These bootable images may be stored in non-contiguous locations in the OS partitions on the system storage, and are not bootable from the pre-boot environment on an information handling system.

Under some field failure conditions (e.g., corrupted OS, RAM or storage device errors, etc.) an information handling OS may not be capable of booting and locating and accessing the bootable images of a diagnostic/service OS on the system storage in order to aid in faster system recovery. In such cases, the cause of the failure may be unknown and the system cannot accessing the diagnostic/service OS, utilities, troubleshooting and diagnostic tools, boot and data recovery information, etc.

Existing solutions can mount an entire FAT32 filesystem in Unified Extensible Firmware Interface (UEFI) pre-boot mode, which has an overhead of mounting the entire filesystem layout/meta-data. This is time consuming and defeats the purpose of dynamic loading.

EFI System Partition (ESP) is created using Globally Unique Identifier (GUID) Partition Table (GPT), and this partition is accessible during UEFI pre-boot mode. There is no interface from the OS that is available to dynamically store or update the EFI partition data. By default, partition space allocated to the ESP is limited in size and can house only partition tools, recovery tools and some smaller images. ESP cannot house larger images such as diagnostic OS images, Windows/Linux OS images, etc.

It is known to provide an information handling system with a pre-boot feature (i.e., Dell BIOSConnect available from Dell Technologies, Inc. of Round Rock, Tex.) that allows the system to download troubleshooting and diagnostic tools across a network while the system is in the pre-boot environment. However, such a feature will not help in those cases where the information handling system is not connected to the Internet, or where such a pre-boot feature is not installed.

SUMMARY

Disclosed herein are systems and methods that may be implemented in a Unified Extensible Firmware Interface (UEFI) pre-boot environment time to dynamically locate and load bootable images stored in one or more operating system (OS) partitions (i.e., containing the operating system folder) on a system storage device/s (e.g., HDD, SSD). Each such OS partition may be formatted with an advanced filesystem (e.g., such as NTFS, EXT3, etc.). The disclosed systems and methods may be so implemented to provide an OS-based filesystem-independent method to access OS filesystem data during UEFI pre-boot time. Further, individual selected boot images stored across multiple OS filesystem partitions may be located and loaded to boot from UEFI pre-boot, e.g., without mounting the bulky complete OS filesystem layout/metadata (e.g., such as NTFS, EXT3, etc.). In one embodiment, UEFI Boot Meta Data may be employed as a light super data to locate only the bootable images in any filesystem, thus aiding faster image boot. In a further embodiment, a secure channel may be created to locate and load bootable images to avoid corruption of existing boot images.

In one embodiment, UEFI Boot Meta Data may be employed as a light super data to locate only the bootable images in any filesystem, thus aiding faster image boot. In this regard, only the meta data of bootable images present in the OS filesystem partitions may be intelligently collected (i.e., the entire filesystem metadata of the OS filesystem partitions is not mounted). This collected meta-data may be separately stored and used to create a boot loader path to enable dynamic loading and booting of the bootable images from the UEFI pre-boot environment upon occurrence of a system failure. In this way, dependency on the OS based filesystems may be overcome, and may be employed seamlessly and irrespective of OS filesystems employed (e.g., NTFS, EXT3, etc.).

In one embodiment, the disclosed systems and methods may be implemented to mount an OS partition during UEFI pre-boot to locate and load or access only desired or needed bootable images on a storage device without mounting the layout and metadata of the entire NTFS/EXT3 or other filesystem, and/or without loading all images stored in the OS partition on the storage device. Advantageously, the disclosed systems and methods may be implemented to scan through the OS partitions to dynamically locate the available bootable images, which may be located non-contiguous to each other on the system storage device/s. In this way, any bootable images stored in the OS partition/s (e.g., NTFS/EXT3, etc.) may be located and selected during pre-boot by the system user to boot into from the UEFI pre-boot environment. The disclosed systems and methods may be so implemented in one embodiment without employing EFI System Partition and/or FAT32 partitions, and without keeping the accessed OS image in a dedicated bootable partition.

In one embodiment, recovery images of a diagnostic OS (e.g., such as Windows RE) may be placed in one or more OS partitions (e.g., Windows OS, Linux OS, etc.) on a system storage device/s. During a system failure (e.g., where the normal OS cannot be booted), the disclosed systems and methods may be implemented during UEFI pre-boot to scan through the OS partition/s to dynamically locate the available bootable recovery images and to determine, select, and only load those particular bootable recovery images that are needed to aid in faster system recovery. Advantageously, such bootable recovery images may be so located and loaded to achieve system recovery during pre-boot even where it is not possible for the system to connect to a network (such as the Internet) during the system pre-boot time. These recovery bootable images may be located in non-contiguous locations within one or more OS partition/s and, as such, a dedicated bootable partition for the diagnostic OS is not required in order to load and executed the desired or needed bootable images.

The disclosed systems and methods may be implemented in one embodiment to provide an interface from the OS to dynamically store or update bootable images in OS level partitions at OS runtime, as well as to provide dynamic access to make any bootable data which is stored at runtime in OS level partitions formatted with NTFS/EXT3 accessible at boot time (e.g., during UEFI pre-boot).

In one respect, disclosed herein is a method including: creating one or more selected bootable images on system storage of an information handling system by writing the one or more selected bootable images to respective locations in at least one operating system (OS) partition on the system storage; and updating metadata with an identity of a current storage location of each of the created selected bootable images on the system storage of the information handling system, the metadata being separate and different from a filesystem of the at least one OS partition.

In another respect, disclosed herein is a method including performing the following in a pre-boot environment prior to booting an operating system (OS) on at least one programmable integrated circuit of an information handling system: using metadata to locate one or more selected bootable images stored in at least one operating system (OS) partition on system storage of the information handling system without mounting a complete filesystem of the at least one OS partition; and then loading, booting and executing the selected bootable images on the programmable integrated circuit. In one embodiment, the one or more selected bootable images include multiple bootable images stored in non-contiguous storage locations in the at least one operating system (OS) partition on system storage of the information handling system, and the method further includes then loading and booting the multiple selected bootable images together on the programmable integrated circuit.

In another respect, disclosed herein is an information handling system, including: at least one programmable integrated circuit; system storage coupled to the programmable integrated circuit, the system storage including one or more non-volatile storage devices having one or more selected bootable images stored thereon at respective locations in at least one operating system (OS) partition on the system storage; and non-volatile storage coupled to the programmable integrated circuit, the non-volatile storage storing metadata separately from the filesystem of the at least one OS partition. The metadata may include an identity of a current storage location of each of the selected bootable images on the system storage of the information handling system, and the metadata may be separate and different from a filesystem of the at least one OS partition.

DESCRIPTION OF ILLUSTRATIVE EMBODIMENTS

Figure 1:
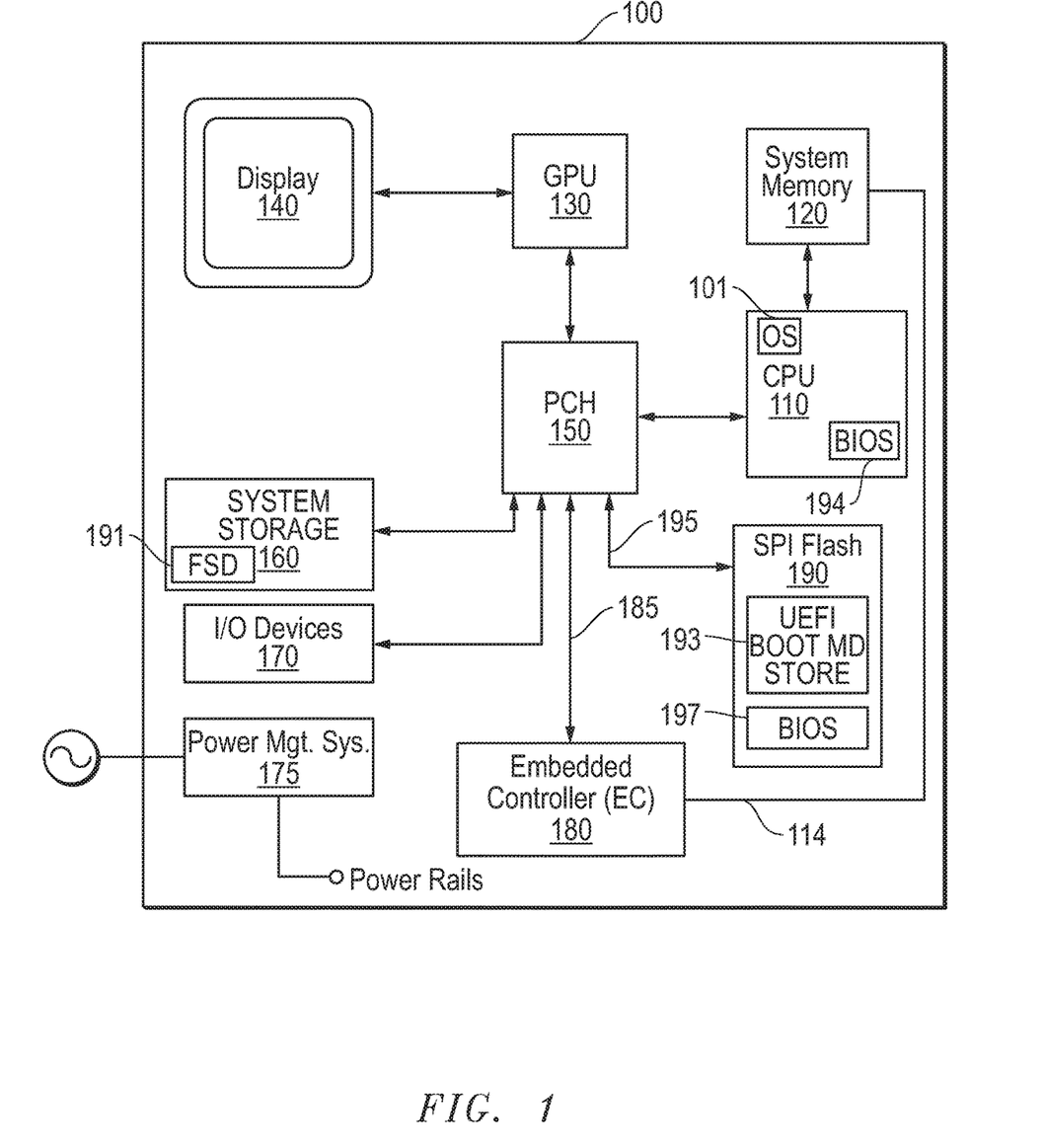
FIG. 1 is a block diagram of an information handling system according to one exemplary embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, information handling system 100 may generally include a host processing device 110 (e.g., programmable integrated circuit such as a central processing unit (CPU)), for executing an operating system (OS) 101 (e.g., Microsoft Windows-based OS such as Windows 10, Linux OS, etc.) for system 100, executing user software applications, etc. CPU 110 may also be configured to access non-volatile serial peripheral interface (SPI) Flash memory 190 to load and boot the code of the system basic input/output system (BIOS) 194 as shown. CPU 110 may include any type of processing device, such as an Intel Pentium series processor, an Advanced Micro Devices (AMD) processor or another programmable integrated circuit. CPU 110 is coupled to system memory 120, which may include, for example, random access memory (RAM), dynamic RAM (DRAM), synchronous DRAM (SDRAM), and other suitable storage mediums. In some embodiments, tasks and functions of SPI Flash 190 described herein may be performed by any other suitable one or more non-volatile memory (NVM) devices, e.g., including solid state drive/s (SSDs), hard drive/s, etc.

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub 150.

Platform controller hub (PCH) 150 controls certain data paths and manages information flow between components of the information handling system. As such, PCH 150 may include one or more integrated controllers or interfaces for controlling the data paths connecting PCH 150 with CPU 110, GPU 130, system storage 160, input/output (I/O) devices 170, embedded controller (EC) 180 and SPI Flash memory device 190 where BIOS firmware image (e.g., BIOS 194) is stored. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

Local system storage 160 (e.g., one or more media drives, such as hard disk drives (HDDs), optical drives, NVRAM devices, Flash memory devices, solid state drives (SSDs), or any other suitable form of internal or external storage) is coupled to PCH 150 to provide permanent storage for information handling system 100. I/O devices 170 (e.g., a keyboard, mouse, touchpad, touchscreen, etc.) are coupled to PCH 150 to enable the user to interact with information handling system 100, and to interact with application programs or other software/firmware executing thereon.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system. For example, power management system 175 may be coupled to provide an operating voltage on a primary power rail to PCH 150, and may be further coupled to provide an operating voltage (e.g., 3.3V) on another power rail to EC 180. In addition to the power rails explicitly shown in FIG. 1, it is noted that power management system 175 may be coupled to provide additional operating voltages on one or more additional power rails to PCH 150, EC 180 and other components of information handling system 100.

Embedded controller (EC) 180 is coupled to PCH 150 and may be configured to perform functions such as power/thermal system management, etc. EC 180 may also be configured to execute program instructions to boot information handling system 100, load application firmware from SPI Flash memory device 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, SPI Flash memory device 190 is a shared Flash memory device, which is connected to PCH 150 and EC 180. In such a configuration, PCH 150 provides EC 180 shared access to SPI Flash memory device 190 via eSPI bus 185, SPI bus 195 and various interface and logic blocks included within the PCH.

Figure 2:
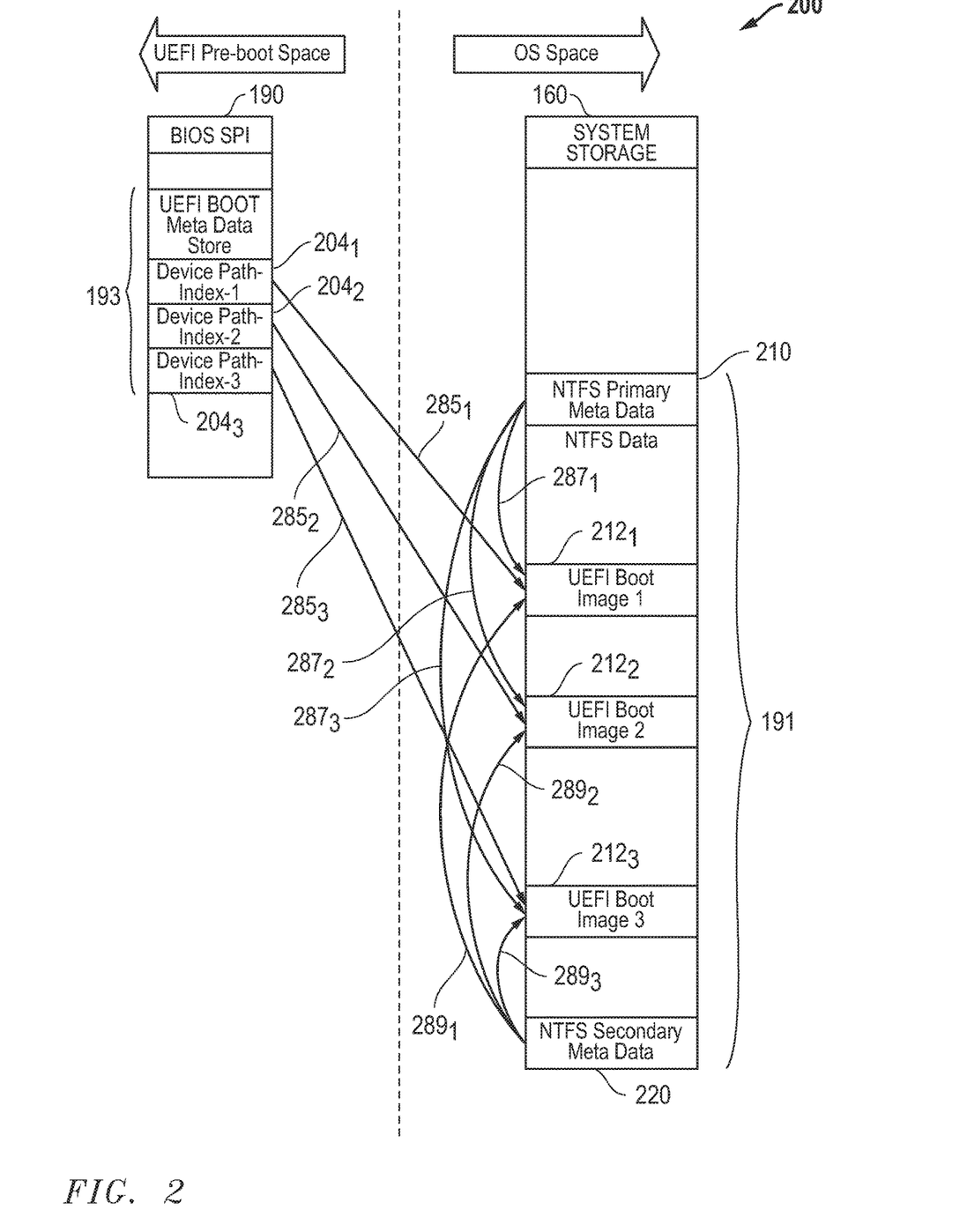
FIG. 2 illustrates a relationship between a UEFI meta data store (MDS) on non-volatile serial peripheral interface (SPI) Flash memory and non-contiguous bootable images of a single filesystem according to one exemplary embodiment of the disclosed systems and methods.

As shown in FIG. 1, filesystem data 191 of one or more OS filesystem/s (e.g., NTFS, EXT3, etc.) containing bootable images (e.g., for OS 101, a diagnostic OS, etc.) in one or more OS level partitions are stored on system storage 160. Also shown is a UEFI Boot Meta Data Store (MDS) 193 that in this embodiment is stored on SPI Flash memory device 190 that also stores system UEFI BIOS 197. As shown in FIG. 2, UEFI MDS 193 includes multiple indices 204 that each contains identity and corresponding storage location (e.g., disk offset, size and/or other bootable image information) on system storage 160 for a respective one of bootable images 212 of the filesystem data 191.

Figure 3:
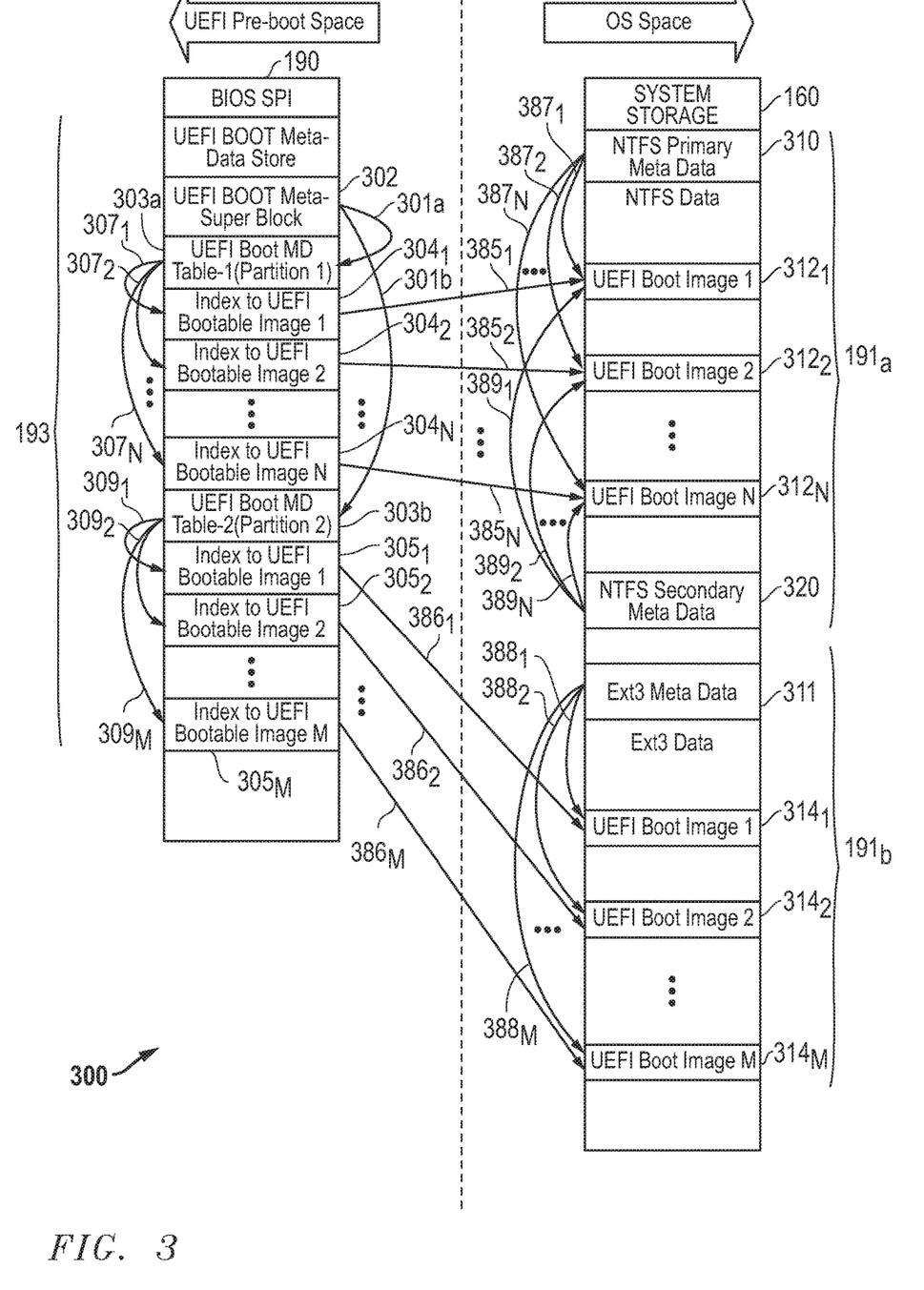
FIG. 3 illustrates a relationship between a UEFI meta data store (MDS) on SPI Flash memory and bootable images of multiple filesystems according to one exemplary embodiment of the disclosed systems and methods.

In some embodiments, MDS 193 may include one or more tables as shown in FIG. 3 (e.g., such as where system storage 160 contains data 191 for multiple OS filesystems in multiple respective partitions). Each of these tables (e.g., tables 303a and 303b in FIG. 3) may be, for example, a lookup table (or other suitable relationship) that indexes storage location of each of the device path indices on UEFI MDS 193 for a given filesystem and partition. In such an embodiment, MDS 193 may also include a Super Block 302 that in turn indexes storage location of these table/s 303 on UEFI MDS 193 as shown and described in relation to FIG. 3. As described further herein, an ACPI Runtime Service may be used to synchronize the UEFI Boot Meta Data store 193 on the SPI Flash memory device 190 with the storage location (e.g., disk data offsets) of the filesystem data 191 on the system storage 160 (including storage location of each of individual bootable images $312_1$ to $312_N$ and $314_1$ to $314_M$), and this synchronized meta data in the UEFI Boot Meta Data Store 193 may be used during UEFI pre-boot time to locate the individual UEFI Boot Images on the OS level partition/s and other filesystem data on system storage 160.

FIG. 2 illustrates a relationship and method 200 between UEFI MDS 193 on UEFI pre-boot space of SPI Flash memory device 190 and non-contiguous bootable images 212 of single filesystem data 191 that are stored in a single filesystem partition of OS space on system storage 160. In one embodiment, relationship 200 may be implemented to allow the UEFI MDS 193 to locate and access bootable images 212$_1$ to 212$_3$ in the partition of filesystem data 191 during UEFI pre-boot time as shown by respective data access paths 285$_1$ to 285$_3$ in FIG. 2. In this example, data 191 for an NTFS file system is shown, although filesystem data 191 may be another type of file system data such as EXT3, etc. Although non-contiguous bootable images 212$_1$ to 212$_3$ are illustrated in FIG. 2, it will be understood it is possible that two or more of the bootable images 212 may be located contiguous with each other in the partition of filesystem data 191. Further, it will be understood that OS space of FIG. 2 may be implemented on any type of storage media from which a system may be allowed to boot.

Still referring to FIG. 2, in one embodiment an Advanced Configuration and Power Interface (ACPI) General Purpose Event (GPE) may be implemented during OS runtime by CPU 110 for runtime creation and/or synchronization of disk data offsets of OS filesystem data 191 with UEFI Boot Meta Data in MDS 193. In such an embodiment, the OS level filesystem data 191 (e.g., NTFS in this embodiment) may include (and use) its own primary meta-data 210 and secondary metadata 220 (e.g., containing data offsets of individual bootable images 212, size of individual bootable images 212, etc.) to locate the non-contiguous UEFI Bootable Images 212$_1$ to 212$_3$ on the partition of filesystem data 191 (along with other filesystem data) during OS runtime as shown by respective data access paths 287$_1$ to 287$_3$ and 289$_1$ to 289$_3$. In such an embodiment, a dynamic ACPI IO object may be used to create device path indices 204$_1$ to 204$_3$ to each of the non-contiguous bootable images 212 and synchronize these device path indices 204$_1$ to 204$_3$ on UEFI boot MDS 193 so that they may be used by programming executing on CPU 110 to locate and access bootable images 212$_1$ to 212$_3$ during a later UEFI pre-boot time.

Creation and/or synchronization of OS file system disk data offsets with UEFI Boot Meta Data in MDS 193 may be accomplished at various times and in a variety of ways. For example, a user may be prompted to allow creation and/or synchronization to occur during a copying operation for OS 101 and/or during creation of bootable images 212 (e.g., such as backup bootable images). Moreover, although FIG. 2 relates to runtime creation and/or synchronization of disk data offsets of OS filesystem data 191 with UEFI Boot Meta Data in MDS 193, it will be understood creation and/or synchronization may alternatively occur during pre-boot time (e.g., by providing a user the option to select creation and/or synchronization of disk data offsets of OS filesystem data 191 with UEFI Boot Meta Data in MDS 193 during system pre-boot).

FIG. 3 illustrates another exemplary embodiment of a relationship and method 300 between UEFI MDS 193 on SPI Flash memory device 190 and bootable images 312 and 314 of respective multiple filesystems 191*a* (e.g., NTFS filesystem) and 191*b* (e.g., EXT3 filesystem) that are stored in multiple respective filesystem partitions on system storage 160 and referenced by the same UEFI MDS 193. Similar to the embodiment of FIG. 2, this relationship and method 300 may be implemented to allow the UEFI MDS 193 to locate and access non-contiguous bootable images 312$_1$ to 312$_N$ in the partition of NTFS filesystem data 191*a* and to locate and access non-contiguous bootable images 314$_1$ to 314$_M$ in the partition of EXT3 filesystem data 191*b* during UEFI pre-boot time. This is shown in FIG. 3 by respective data access paths 385$_1$ to 385$_N$ and 387$_1$ to 387$_M$. It will be understood that it is possible that any two or more (e.g., three or more) different filesystems may be similarly contained and located/accessed in separate partitions of a system storage 160. As before, although non-contiguous bootable images 312$_1$ to 312$_N$ and 314$_1$ to 314$_N$ are illustrated in FIG. 3, it will be understood it is possible that two or more of the bootable images 312 and/or 314 may be located contiguous with each other in the partition of each of filesystems 191*a* and 191*b*.

Also shown in FIG. 3 is first UEFI boot metadata table 303*a* that indexes location of each of device path indices 304$_1$ to 304$_N$ on UEFI MDS 193 of SPI Flash memory device 190 via respective data access paths 307$_1$ to 307$_N$, and UEFI boot metadata table 303*b* that indexes location of each of device path indices 305$_1$ to 305$_N$ on UEFI MDS 193 of SPI Flash memory device 190 via respective data access paths 309$_1$ to 309$_M$. In such an embodiment, MDS 193 may also include a Super Block 302 that in turn indexes location of each of these table/s 303*a* and 303*b* on UEFI MDS 193 of SPI Flash memory device 190 via respective data access paths 301*a* and 301*b*.

Still referring to FIG. 3, in one embodiment an ACPI GPE may be implemented during OS runtime by CPU 110 for runtime synchronization of disk data offsets of OS filesystem data 191 with UEFI Boot Meta Data in MDS 193. In such an embodiment, OS level filesystem data 191*a* (NTFS in this embodiment) may include (and use) its own primary meta-data 310 and secondary metadata 320 (e.g., containing data offsets of individual bootable images 312, size of individual bootable images 312, etc.) to locate the non-contiguous UEFI Bootable Images 312$_1$ to 312$_N$ on the partition of filesystem data 191*a* (along with other filesystem data) during OS runtime as shown by respective data access paths 387$_1$ to 387$_N$ and 389$_1$ to 389$_N$. In such an embodiment, a dynamic ACPI IO object may be used to create device path indices 304$_1$ to 304$_N$ to each of the respective non-contiguous bootable images 312$_1$ to 312$_N$ and synchronize these device path indices 304$_1$ to 304$_N$ on UEFI boot MDS 193 so that they may be used by programming executing on CPU 110 to locate and access bootable images 312$_1$ to 312$_N$ during UEFI pre-boot time.

Similarly, OS level filesystem data 191*b* (EXT3 in this embodiment) may use its own primary meta-data 311 (e.g., containing data offsets of individual bootable images 314, size of individual bootable images 314, etc.) to locate the non-contiguous UEFI Bootable Images 314$_1$ to 314$_M$ on the partition of filesystem data 191*b* (along with other filesystem data) during OS runtime as shown by respective data access paths 388$_1$ to 388$_M$. In such an embodiment, a dynamic ACPI IO object may be used to create device path indices 305$_1$ to 305$_M$ to each of the respective non-contiguous bootable images 314$_1$ to 314$_M$ and synchronize these device path indices 305$_1$ to 305$_M$ on UEFI boot MDS 193 so that they may be used by programming executing on CPU 110 to locate and access bootable images 314$_1$ to 314$_M$ during UEFI pre-boot time.

Figure 4:
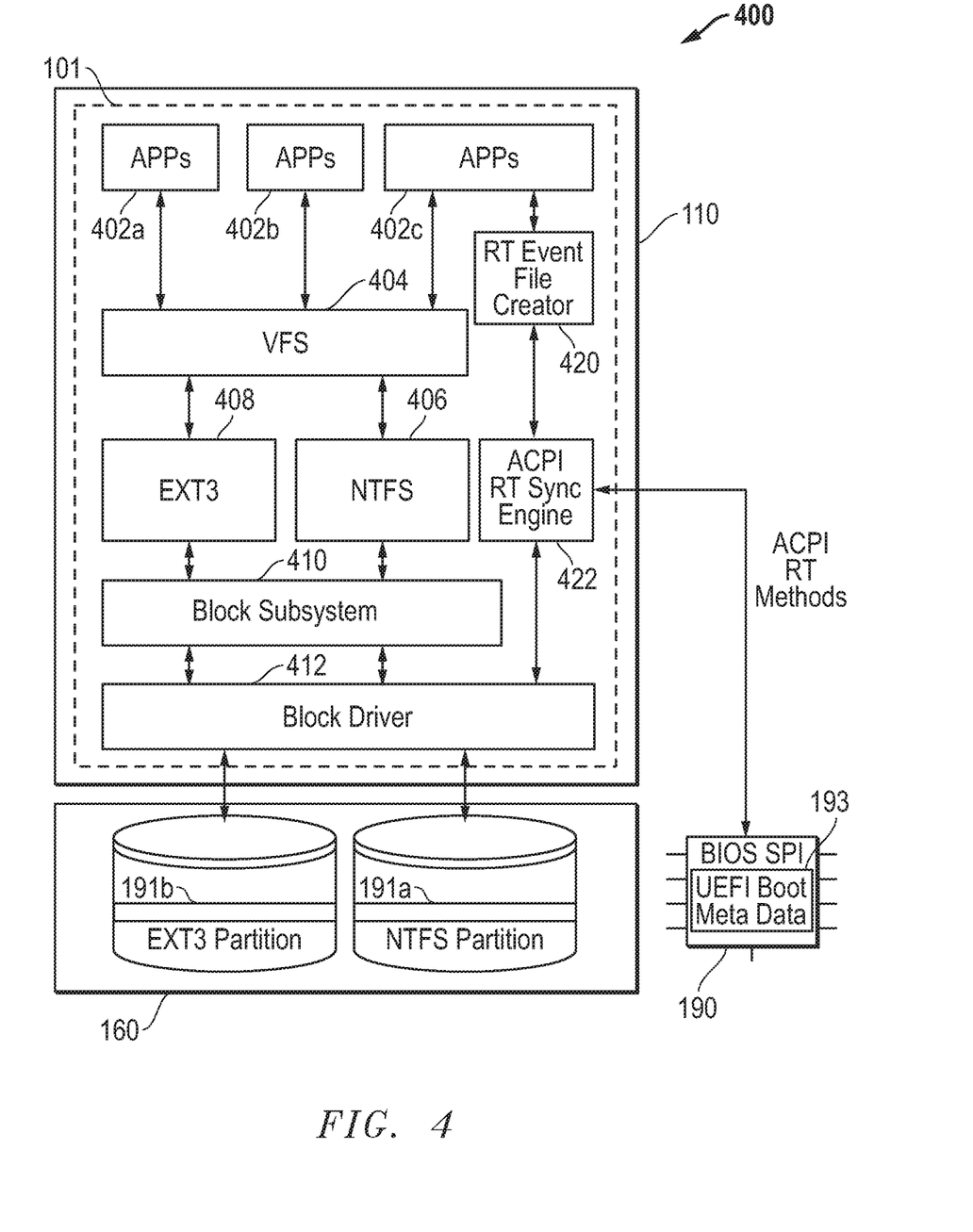
FIG. 4 illustrates architectural flow of creation and/or synchronization of a UEFI meta data store (MDS) on SPI Flash memory with disk data offsets in partitions of multiple filesystems on system storage according to one exemplary embodiment of the disclosed systems and methods.

FIG. 4 illustrates architectural flow 400 of creation and/or synchronization of the UEFI Boot Meta Data store 193 on the SPI Flash memory device 190 with the disk data offsets in the partitions of filesystems 191*a* and 191*b* on the system storage 160 during OS runtime of an OS (e.g., such as Windows or Linux-based OS on host processing device 110). This synchronized meta data in the UEFI Boot Meta Data Store 193 may then be used during UEFI pre-boot time to locate and access the UEFI Boot Images on the OS level partition/s 191*a* and 191*b* on system storage 160, e.g., as shown and described in relation to FIG. 3.

In FIG. 4, multiple components executing on OS 101 include a runtime (RT) event creator 420 and ACPI RT Synchronization engine 422, that execute together with other illustrated OS components of OS 101. As shown in FIG. 4, multiple applications 402a to 402c (e.g., user applications, file system applications, etc.) are executing on OS 101. In FIG. 4, application 402c wants to create a copy of a bootable image. Accordingly, application 402c triggers an ACPI RT event by creating a target bootable image (boot file or boot image) 312 or 314 on one of the local filesystems 191a or 191b (e.g., NTFS or EXT3 in FIG. 3) through virtual file system 404, NTFS filesystem 406 or EXT3 filesystem 408, block subsystem 410 and block driver 412. The current bootable image 312 or 314 may, for example, correspond a recovery image of a diagnostic OS such as Windows RE.

Still referring to FIG. 4, the RT Event creator 420 receives the bootable image creation trigger from application 402c, and responds by triggering the ACPI RT synchronization engine 422 to tap into block driver 412 to get the offsets of the given target bootable image being written on to the filesystem data 191a or 191b on system storage 160 at that point of time. Even if there are multiple files being written to system storage 160 by applications 402a to 402c at any point of time to the disk, the RT Synchronization engine 422 confirms the start offset of the target bootable image based on the file signature of the bootable image, and updates the start offset of the target bootable image into UEFI Boot Meta Data store area 193 on BIOS SPI Flash 190. The RT Event File Creator 420 collects the file size, name and other basic attributes and updates the meta data in UEFI Boot Meta Data store area 193 on BIOS SPI Flash 190, as well as in file system data 191 or 193 to handle disk movements across systems.

Once the UEFI Boot Meta Data store area 193 on BIOS SPI Flash 190 is updated with the meta-data information of the bootable image/s 312 or 314 in a respective OS partition of file system 191a or 191b on system storage 160, then irrespective of OS file system getting initialized the bootable image/s 312 may be located and accessed from the BIOS SPI Flash 190 during UEFI pre-boot time to aid boot from the respective OS partition of file system 191a or 191b. In one embodiment, decoding of NTFS/EXT3 meta-data is not required as the ACPI RT Synchronization engine 422 performs this task in the backend by intelligently collecting the data offsets and size.

Figure 5:
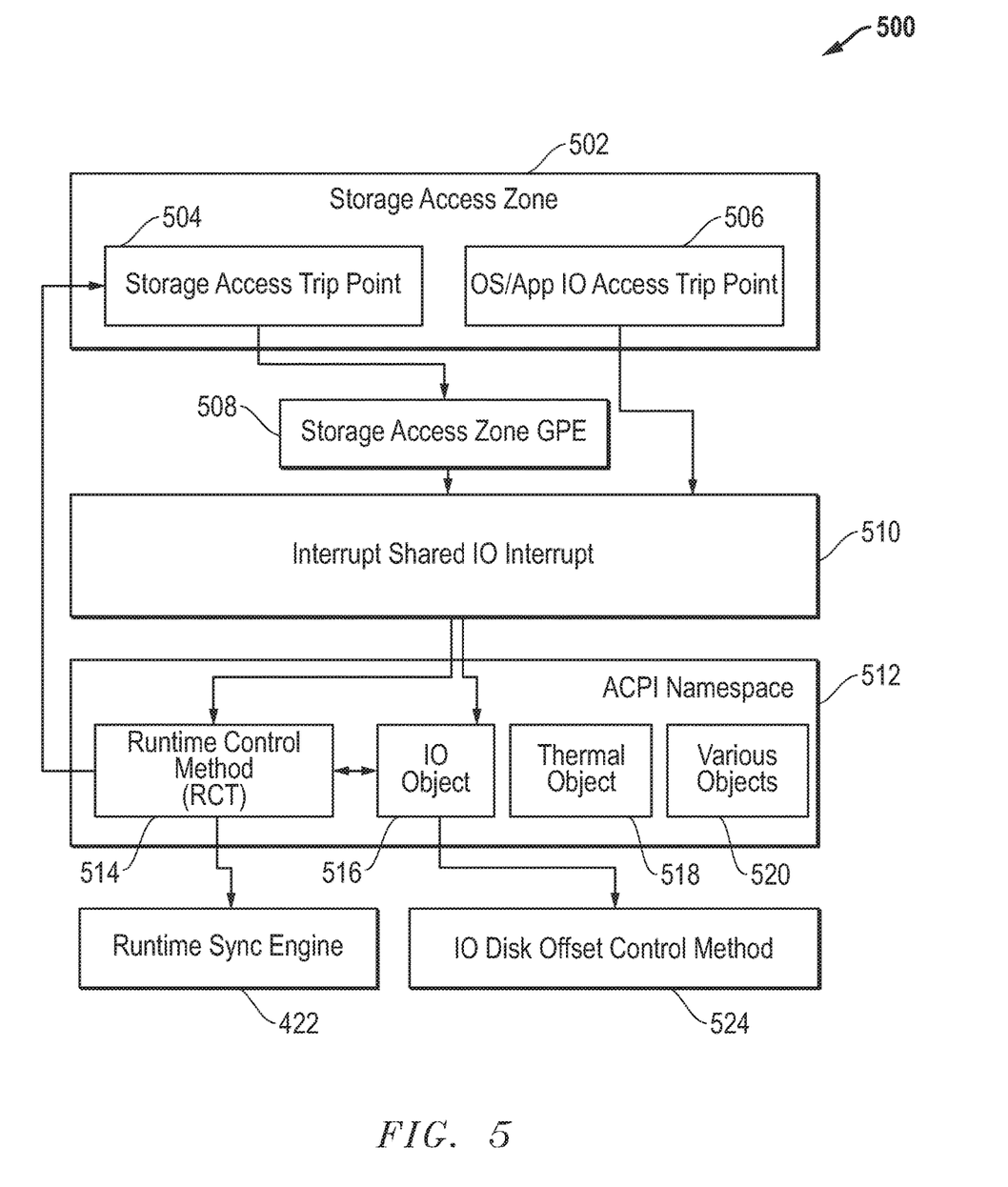
FIG. 5 illustrates methodology employing an ACPI general purpose event (GPE) for synchronization of a UEFI namespace of a UEFI meta data store (MDS) on SPI Flash memory according to one exemplary embodiment of the disclosed systems and methods.

FIG. 5 illustrates one exemplary embodiment of methodology employing an ACPI general purpose event (GPE) 500 as it may be implemented (e.g., by OS stack 101 of information handling system 100) for OS runtime synchronization of a UEFI namespace of the UEFI Boot Meta Data Store 193 on the SPI Flash memory device 190 with the disk data offsets in the filesystem data 191 on the system storage 160. GPEs are ACPI events that are not pre-defined by the ACPI specification, and are usually handled by evaluating control methods, which are objects in the ACPI namespace 512 (such as thermal object 518 and other various objects 520) and can access system hardware. As shown in FIG. 5, when the ACPI subsystem evaluates the control method with the ACPI Machine Language (AML) interpreter, the GPE object handles the events according to the OS's implementation. Typically this might involve issuing a notification to a device to invoke the device driver to perform a function.

In FIG. 5, a storage access zone GPE 508 is implemented for IO object access 516 and Runtime Control Methods 514 to synchronize the UEFI namespace object of the UEFI Boot Meta Data Store 193 on the SPI Flash memory device 190 with the disk data offsets in the filesystem data 191 on the system storage 160. As shown, FIG. 5 proceeds with the following sequential steps: 1) When the system initially finds an ACPI Storage Access Zone 502 in the namespace, it loads the Storage Zone Handler to evaluate the Storage Zone 502 to determine the occurrence of an OS/Application IO trip point 506 and storage access point 504; 2) When the IO 506 is performed with an add/delete to storage object/offsets via accompanying storage access trip point 504, a storage access zone GPE 508 is caused to occur as shown; 3) The storage access zone GPE 508 causes an interrupt shared IO interrupt 510 to occur; 4) When the OS 101 receives the interrupt 510, the handler searches the namespace of the Runtime Control Method (RCT) 514 corresponding to the GPE 508 and provides the access for IO object 516 (e.g., corresponding to a bootable image); 5) The Storage Zone Handler triggers IO Disk Offset Control Method 524 to get the disk offsets, size and other attributes of the IO object 516; 6) Upon completion of the storage access and IO add/delete to storage object/offsets, the RCT 514 uses the Runtime Synchronization Engine 422 to perform pre-boot UEFI object update in SPI namespace of the UEFI Boot Meta Data store area 193 on BIOS SPI Flash 190.

Figure 6:
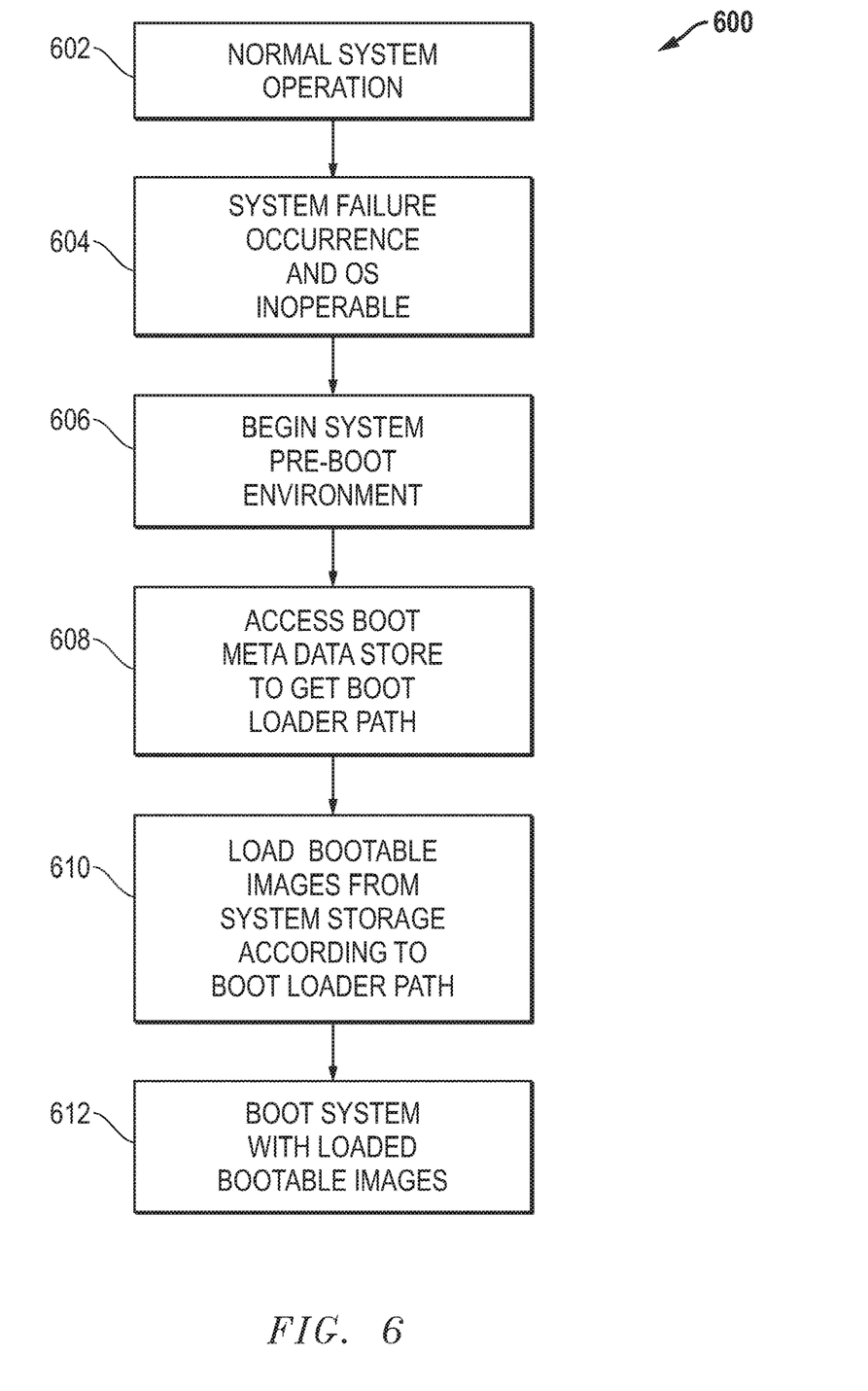
FIG. 6 illustrates methodology according to one exemplary embodiment of the disclosed systems and methods.

FIG. 6 illustrates one embodiment of a methodology 600 that may be implemented (e.g., by host processing device 110 of system 100) after a system failure that renders the normal OS 101 inoperable. Such a system failure may be, for example, a system crash or other software, firmware and/or hardware failure. As shown in FIG. 6, methodology 600 begins in step 602 with system 100 operating normally with OS 101 booted and executing on host processing device 110. Upon occurrence of the system failure in step 604, OS 101 becomes inoperable as shown. At this time, system 100 may automatically shut down (or be shut down by the user), followed by system reboot on host processing device 110 beginning in step 606, at which time the system enters a pre-boot environment sequence (e.g., UEFI pre-boot environment) including power-on self-test (POST). Alternatively, it is possible that host processing device may automatically proceed with restart and system reboot of step 606 upon occurrence of a system failure of step 604.

Still referring to FIG. 6, upon successful completion of POST, methodology 600 proceeds during the preboot environment to get or retrieve the boot loader path from the Boot MDS 193 stored on SPI Flash 190, and without mounting the layout and metadata the entire filesystem 406/408. This boot loader path may include boot path of one or more bootable images 212, 312 and/or 314 (e.g., such as recovery bootable images of a diagnostic or recovery OS) on system storage 160 as previously described in relation to FIGS. 2 to 5. Next, in steps 610 and 612, host processing device 110 may execute boot loader (bootstrap loader) code to use the boot loader path to load and boot the one or more bootable images 212, 312 and/or 314 (e.g., such as bootable images of a diagnostic or recovery OS) without loading all bootable images from system storage 160. Once so booted, the recovery bootable images may be executed by host processing device 110 for diagnostics and/or system recovery purposes, e.g., to repair OS 101, locate and recover data files on system storage 160, etc.

It will be understood that the steps of FIGS. 5 and 6 are exemplary only, and that any combination of fewer, additional and/or alternative steps may be employed that are suitable for synchronizing a UEFI Boot Meta Data Store maintained on a SPI Flash memory device (or other suitable non-volatile storage media) with the disk data offsets (e.g., bootable images) in a filesystem on the system storage, and/or locating and loading bootable images on the system storage during a pre-boot environment. Further, although described in relation to the embodiment of system 100 of FIG. 1, it will be understood that the disclosed methods of FIGS. 5 and/or 6 may be implemented on other configurations of information handling system components, e.g., that include fewer, additional and/or alternative system components to that shown and described in relation to FIG. 1.

It will also be understood that one or more of the tasks, functions, or methodologies described herein (e.g., including those described herein for components 110, 120, 130, 160, 180, 190, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method, comprising:
creating multiple selected bootable images on system storage of an information handling system by writing the multiple selected bootable images to respective non-contiguous storage locations in at least one operating system (OS) partition on the system storage; and
updating boot metadata of a Unified Extensible Firmware Interface (UEFI) on the information handling system with an identity of a current storage location of each of the created selected bootable images on the system storage of the information handling system, the UEFI boot metadata being separate and different from filesystem data of the at least one OS partition;
where the selected bootable images are bootable using the UEFI boot metadata by a host programmable integrated circuit of the information handling system from a UEFI pre-boot environment at the same time an OS of the at least one OS partition is not operating.

2. The method of claim 1, where the UEFI boot metadata is stored together with a UEFI firmware image in non-volatile storage of the information handling system separately from the filesystem data of the at least one OS partition.

3. The method of claim 1, where the current storage location of the selected bootable images comprises respective disk data offsets of the selected bootable images in the at least one OS partition on the system storage of the information handling system.

4. The method of claim 1, where the method further comprises writing the selected bootable images in the at least one OS partition on a system storage device of the information handling system; and where the updated UEFI boot metadata is stored together with UEFI basic input/output system (BIOS) code in a non-volatile serial peripheral interface (SPI) Flash memory device that is separate from the system storage device.

5. The method of claim 1, where the selected bootable images comprise recovery images of a diagnostic OS; and where the method further comprises executing a first OS during a system runtime, the first OS being different from the diagnostic OS.

6. The method of claim 1, where the creating multiple selected bootable images further comprises writing the multiple selected bootable images that are bootable from the UEFI pre-boot environment without booting an OS of the at least one OS partition and without employing EFI System Partition and/or FAT32 partitions and without keeping the selected bootable images in a dedicated bootable partition.

7. The method of claim 1, where the method further comprises creating the multiple selected bootable images on the system storage of the information handling system by writing the multiple selected bootable images to multiple different OS partitions on the system storage of the information handling system.

8. The method of claim 1, where the creating further comprises using a dynamic Advanced Configuration and Power Interface (ACPI) General Purpose Event (GPE) during OS runtime to create device path indices to each of the multiple non-contiguous bootable images and to synchronize these device path indices on the UEFI boot metadata to be located and accessed by a host programmable integrated circuit of the information handling system during a later UEFI pre-boot time.

9. A method, comprising:
creating one or more selected bootable images on system storage of an information handling system by writing the one or more selected bootable images to respective locations in at least one operating system (OS) partition on the system storage; and
updating metadata with an identity of a current storage location of each of the created selected bootable images on the system storage of the information handling system, the metadata being separate and different from filesystem data of the at least one OS partition;
where the selected bootable images are only a portion of all the bootable images being written to respective locations in the at least one OS partition on the system storage; and where the method further comprises:
responding to the creation of the one or more selected bootable images on the system storage by obtaining a file signature of each of the one or more selected bootable images,
determining an identity of each of the selected bootable images written to the system storage by comparing and matching the file signature of each of the selected bootable images to a respective file signature of a bootable image written to the system storage to distinguish the selected bootable images from any remaining non-selected bootable images written to the system storage,
then obtaining an identity of the storage location of each of the confirmed selected bootable images as written to the system storage, and
then updating the metadata with the obtained identity of the current storage location of each of the confirmed selected bootable images as written to the system storage of the information handling system without updating the metadata with an identity of a storage location of any remaining non-selected bootable images as written to the system storage of the information handling system.

10. A method, comprising performing the following in a Unified Extensible Firmware Interface (UEFI) pre-boot environment prior to booting an operating system (OS) on at least one programmable integrated circuit of an information handling system:
scan through one or more operating system (OS) partitions on system storage of the information handling system using UEFI boot metadata that is separate and different from filesystem data of the OS partitions to dynamically locate one or more selected bootable images stored in at least one of the OS partitions without mounting a complete filesystem of the at least one OS partition; and
then loading, booting and executing the selected bootable images on the programmable integrated circuit from the UEFI pre-boot environment at the same time an OS of the at least one OS partition is not operating.

11. The method of claim 10, where the selected bootable images are only a portion of all the bootable images stored in the least one OS partition; and where the method further comprises loading and booting only the selected bootable images on the programmable integrated circuit without loading and booting the remaining bootable images stored in the at least one OS partition.

12. The method of claim 11, where the UEFI boot metadata is stored together with a UEFI firmware image in non-volatile storage of the information handling system separately from the filesystem data of the at least one OS partition; and where the method further comprises updating the UEFI boot metadata with the current storage location of the selected bootable images stored in the at least one operating system (OS) partition prior to scanning through the operating system (OS) partitions on the system storage using the UEFI boot metadata to locate the selected bootable images stored in the at least one operating system (OS) partition on the system storage of the information handling system.

13. The method of claim 12, where the current storage location of the selected bootable images comprises respective disk data offsets of the selected bootable images in the at least one operating system (OS) partition on the system storage of the information handling system; and where the method further comprises using the UEFI boot metadata to locate the selected bootable images without referencing the filesystem prior to loading and booting the selected bootable images on the programmable integrated circuit.

14. The method of claim 10, further comprising:
scanning through the operating system (OS) partitions on the system storage using the UEFI boot metadata to locate one or more selected bootable images stored in multiple OS partitions on the system storage of the information handling system without mounting the complete filesystems of the OS partitions; and
then loading and booting the selected bootable images on the programmable integrated circuit from the UEFI pre-boot environment at the same time the OS of the at least one OS partition is not operating.

15. The method of claim 10, where the selected bootable images are stored in the at least one OS partition on a system storage device of the information handling system; and where the UEFI boot metadata is stored together with UEFI basic input/output system (BIOS) code in a non-volatile serial peripheral interface (SPI) Flash memory device that is separate from the system storage device.

16. The method of claim 10, where the selected bootable images comprise recovery images of a diagnostic OS; and where the method further comprises:
executing a first OS during a system runtime, the first OS being different from the diagnostic OS; and
then responding to occurrence of a system failure where the first OS is unable to boot by locating, loading and booting the selected bootable images of the diagnostic OS on the programmable integrated circuit.

17. The method of claim 10, where the selected bootable images comprise multiple bootable images stored in non-contiguous storage locations in the at least one operating system (OS) partition on system storage of the information handling system; and where the method further comprises then loading and booting the multiple selected bootable images together on the programmable integrated circuit.

18. The method of claim 10, where the selected bootable images comprise multiple bootable images stored in non-contiguous storage locations in multiple operating system (OS) partitions on system storage of the information handling system; and where the method further comprises then loading and booting the multiple selected bootable images together on the programmable integrated circuit.

19. The method of claim 10, further comprising:
first executing the OS of the at least one OS partition on a host programmable integrated circuit of the information handling system; and
then responding to a system failure that renders the OS inoperable by executing the host programmable integrated circuit to perform the loading, booting and executing the selected bootable images on the programmable integrated circuit at the same time that the OS is inoperable.

20. An information handling system, comprising:
at least one host programmable integrated circuit programmed to execute an operating system (OS) for the information handling system;
system storage coupled to the host programmable integrated circuit, the system storage comprising one or more non-volatile storage devices having one or more selected bootable images stored thereon at respective locations in at least one operating system (OS) partition on the system storage; and
non-volatile storage coupled to the host programmable integrated circuit, the non-volatile storage storing Unified Extensible Firmware Interface (UEFI) boot metadata separately from the filesystem data of the at least one OS partition;
where the UEFI boot metadata comprises an identity of a current storage location of each of the selected bootable images on the system storage of the information handling system, the UEFI boot metadata being separate and different from a filesystem data of the at least one OS partition; and
where the selected bootable images are bootable using the UEFI boot metadata by the host programmable integrated circuit from a UEFI pre-boot environment at the same time the OS of the at least one OS partition is not operating.

21. The information handling system of claim 20, where the selected bootable images are only a portion of all the bootable images stored in the least one OS partition on the system storage; and where the programmable integrated circuit is programmed to:
create the selected bootable images on the system storage by writing the selected bootable images to respective locations in the at least one OS partition on the system storage; and
update the UEFI boot metadata with an identity of the current storage location of each of the created selected bootable images on the system storage, the UEFI boot metadata being separate and different from a filesystem data of the at least one OS partition.

22. The information handling system of claim 20, where the selected bootable images are only a portion of all the bootable images stored in the least one OS partition on the system storage; and where the programmable integrated circuit is programmed to perform the following in a pre-boot environment prior to booting an OS of the information handling system:
scan through one or more operating system (OS) partitions on system storage of the information handling system using the UEFI boot metadata that is separate and different from filesystem data of the OS partitions to dynamically locate the selected bootable images stored in at least one of the OS partitions without mounting a complete filesystem of the at least one OS partition; and
then load, boot and execute the selected bootable images from the UEFI pre-boot environment at the same time the OS is not operating.

23. The information handling system of claim 20, where the UEFI boot metadata is stored separately from the filesystem data of the at least one OS partition and stored together with UEFI basic input/output system (BIOS) code in a non-volatile serial peripheral interface (SPI) Flash memory device that is separate from the non-volatile storage devices of the system storage; where the current storage location of the selected bootable images comprises respective disk data offsets of the selected bootable images in the at least one OS partition on the system storage; and where the selected bootable images comprise multiple selected bootable images stored at respective non-contiguous storage locations in the at least one OS partition on the system storage.

24. The information handling system of claim 23, where the selected bootable images comprise multiple selected bootable images stored on multiple different OS partitions of the system storage.

* * * * *